United States Patent
Yan et al.

(10) Patent No.: US 10,748,178 B2
(45) Date of Patent: Aug. 18, 2020

(54) PREDICTION OF CONTENT PERFORMANCE IN CONTENT DELIVERY BASED ON PRESENTATION CONTEXT

(71) Applicant: ADOBE INC., San Jose, CA (US)

(72) Inventors: Zhenyu Yan, Sunnyvale, CA (US); Xiang Wu, San Jose, CA (US); Chen Dong, San Jose, CA (US); Abhishek Pani, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 782 days.

(21) Appl. No.: 14/874,298

(22) Filed: Oct. 2, 2015

(65) Prior Publication Data

US 2017/0098239 A1   Apr. 6, 2017

(51) Int. Cl.
 G06Q 30/00 (2012.01)
 G06Q 30/02 (2012.01)

(52) U.S. Cl.
 CPC ..... G06Q 30/0247 (2013.01); G06Q 30/0275 (2013.01)

(58) Field of Classification Search
 None
 See application file for complete search history.

(56) References Cited

U.S. PATENT DOCUMENTS

| | | | |
|---|---|---|---|
| 7,743,001 B1* | 6/2010 | Vermeulen | G06Q 30/02 705/400 |
| 9,256,688 B2* | 2/2016 | Hummel | G06Q 30/02 |
| 2007/0156757 A1* | 7/2007 | Tang | G06F 16/951 |
| 2007/0179832 A1* | 8/2007 | Reich | G06Q 10/06375 705/7.29 |

(Continued)

FOREIGN PATENT DOCUMENTS

| | | | | |
|---|---|---|---|---|
| JP | 2010081783 A | * | 4/2010 | G06Q 50/06 |
| JP | 2013011985 A | * | 1/2013 | G06F 17/27 |

OTHER PUBLICATIONS

Leavitt, Nadea. Demystifying Predictive Analytics and an Introduction to Recent Methodological Innovations. (Jun. 1, 2011). Retrieved online Apr. 4, 2020. https://www.ispor.org/docs/default-source/presentations/1025.pdf?sfvrsn=fc52fe9b_1 (Year: 2011).*

(Continued)

*Primary Examiner* — James A Reagan

(74) *Attorney, Agent, or Firm* — Shook, Hardy & Bacon L.L.P.

(57) ABSTRACT

In various implementations, analytics data is received that indicates performance of bid targets for historical bids made in one or more content delivery auctions. Baseline prediction models are maintained for the bid targets. The baseline prediction models use the analytics data to predict performance of the bid targets in one or more future instances of at least one content delivery auction. A presentation context factor model is maintained that provides an adjustment factor that quantifies a contribution of a subset of a plurality of presentation context factors associated with the bid targets to performance of the bid targets based on predicted values from the baseline prediction models. A contextual predicted value is computed using the adjustment factor for the subset of the plurality of presentation context factors. A performance prediction is transmitted to a user device and is based on at least the contextual predicted value.

19 Claims, 6 Drawing Sheets

(56) References Cited

U.S. PATENT DOCUMENTS

| | | | | |
|---|---|---|---|---|
| 2009/0299855 A1* | 12/2009 | Li | ............ | G06Q 30/02 705/14.54 |
| 2010/0138291 A1* | 6/2010 | Silverman | ............ | G06Q 30/02 705/14.45 |
| 2011/0010239 A1* | 1/2011 | Vijay | ............ | G06Q 30/02 705/14.42 |
| 2011/0047025 A1* | 2/2011 | Demir | ............ | G06Q 30/02 705/14.43 |
| 2012/0084141 A1* | 4/2012 | Quinn | ............ | G06Q 30/0244 705/14.43 |
| 2013/0166371 A1* | 6/2013 | Mukherjee | ............ | G06Q 30/0251 705/14.41 |
| 2014/0108162 A1* | 4/2014 | Kumar | ............ | G06Q 30/02 705/14.72 |
| 2015/0227964 A1* | 8/2015 | Yan | ............ | G06Q 30/0244 705/14.43 |
| 2019/0180379 A1* | 6/2019 | Nayak | ............ | G06Q 40/08 |

OTHER PUBLICATIONS

Guazzelli, Alex. Predictive modeling techniques Explore the mathematical algorithms that make up the core of predictive analytics. (Jun. 19, 2012). Retrieved online Apr. 4, 2020. https://developer.ibm.com/technologies/predictive-analytics/articles/ba-predictive-analytics2/ (Year: 2012).*

Perry, Walter L. Predictive Policing—The Role of Crime Forecasting in Law Enforcement Operations. (Sep. 30, 2013). Retrieved online Apr. 4, 2020. https://www.rand.org/content/dam/rand/pubs/research_reports/RR200/RR233/RAND_RR233.pdf (Year: 2013).*

* cited by examiner

FIG. 2A

Edit Portfolio - SEM - EN                                              ✕

▶ Name
Spend Management          Name
Objective                 Portfolio Name            Status
Modeling - Learning       | SEM - EN |              | Optimized ▼ |   ☑ Billable
Modeling - Recency                      254
Campaigns — 252
Limits                    Cost prediction
                                                    258A       258B       258C
                          Adjustment method         Day of week | Before adj. | Adj. factor | After adj.
                          | Day of week ▼ |         Monday       | 10415       | 1.021       | 10634
                          ☑ Use day of week cost model   Tuesday | 10415       | 0.843       | 8784
                                       258          Wednesday    | 10415       | 1.029       | 10716
                                                    Thursday     | 10415       | 0.998       | 10396
                                                    Friday       | 10415       | 0.921       | 9594
                                                    Saturday     | 10415       | 1.024       | 10666
                                                    Sunday       | 10415       | 1.163       | 12119

☑ Auto adjust campaign budge limits
                          Multiple                  Minimum Budget Limit set for each Campaign
                          | 2.00 |                  $ | 5.00 |
                                                          256
                          ☑ Auto adjust mobile bids — 250
                          | Delete |
                          | Save |
                          | Cancel |

Edit Portfolio - SEM - EN — 200

- Name — 252
- Spend Management
- Objective
- Modeling - Learning
- Modeling - Recency
- Campaigns
- Limits

Name

Portfolio Name: SEM - EN — 254

Status: Optimized  ☑ Billable

Cost prediction

Adjustment method: Geographic locations ▾

☑ Use Geo. cost model — 260

| Locations | Before adj. | Adj. factor | After adj. |
|---|---|---|---|
| United States - country | 69506 | 2.838 | 197280 |
| Canada - country | 69506 | 0.339 | 23561 |
| China - country | 69506 | 0.659 | 45829 |
| India - country | 69506 | 0.163 | 11354 |

☑ Auto adjust campaign budge limits

Multiple: 2.00    Minimum Budget Limit set for each Campaign: $ 5.00 — 256

☑ Auto adjust mobile bids

266 — [ Delete ] [ Save ] [ Cancel ]

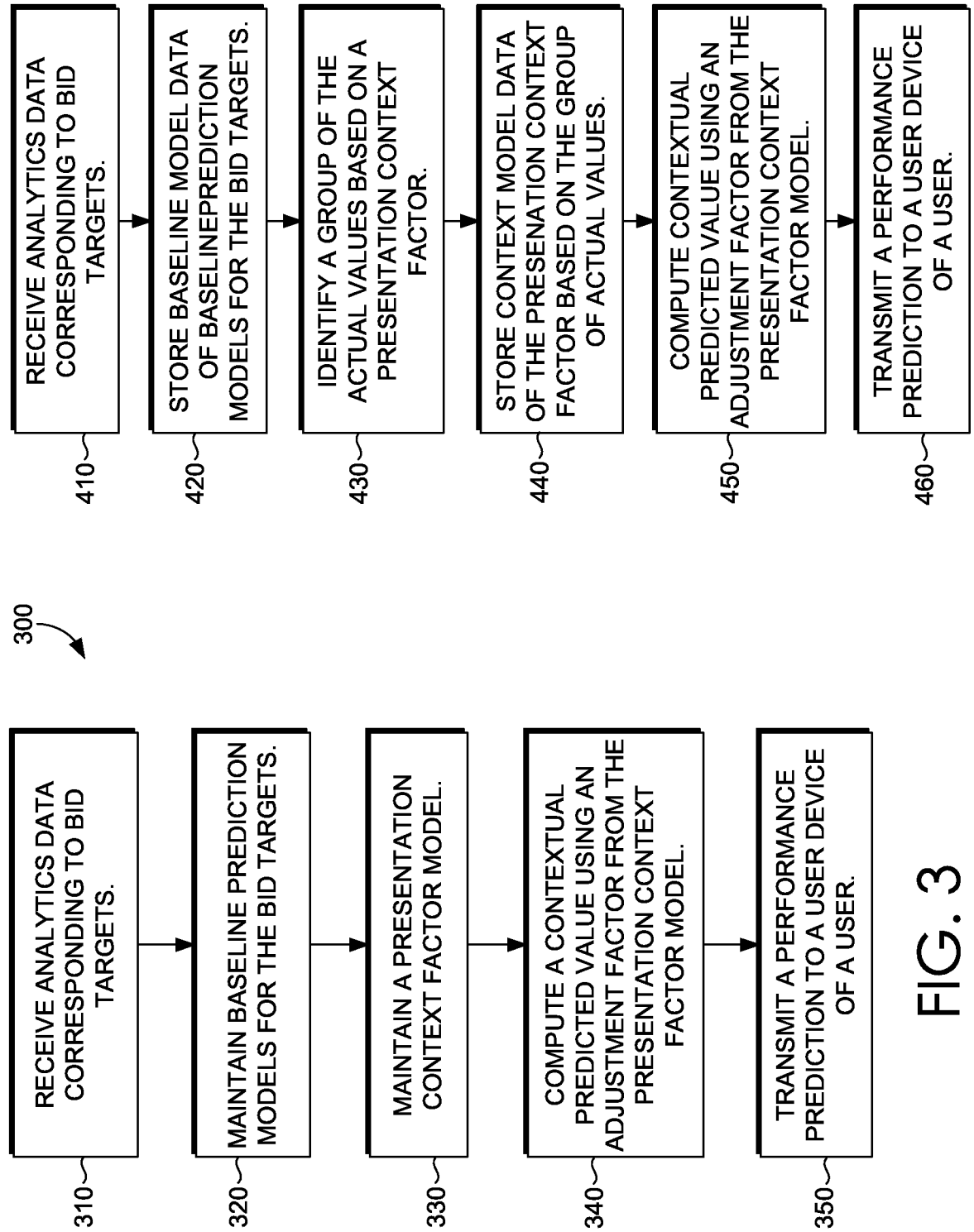

PREDICTION OF CONTENT PERFORMANCE IN CONTENT DELIVERY BASED ON PRESENTATION CONTEXT

BACKGROUND

In the online space, content publishers are often tasked with making decisions for allocating and serving content to clients in connection with presentation opportunities. One approach a content publisher may utilize for these decisions is an auction-based content delivery system where bids are made on bid targets, such as key words, to rank and select content for the presentation opportunities. Content may be displayed in a particular order or pattern or otherwise be selected for placement in a webpage or other presentation medium based on the bids. Higher ranked content is typically more prominently displayed to clients on client devices.

Bidders can use bid management tools, such as Adobe® Media Optimizer to assist in determining how much to bid on bid targets in content delivery auctions. These tools may assist users by predicting the performance of bid targets based on historical observations of their performance in a content delivery auction. Predictions for a bid target may be more accurate when they factor in the time of day or other context of presenting content in the content delivery auction. Typically, a dedicated model is used to predict performance of a bid target with respect to a particular set of context factors. Thus, an entirely new model with associated storage and processing is required to predict performance for the bid target with respect to at least one different context factor, or the same context factors for a different bid target. Additionally, this approach is prone to providing unreliable predictions because the number of historical observations that match both the bid target and each context factor being predicted by a model may be sparse, especially for a large set of context factors.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention employ a multi-staged modeling approach for predicting the performance of bid targets in content delivery auctions from historical observations of their performance. In one stage, baseline prediction models predict the performance of bid targets without consideration to context factors. The number of historical observations applied to each baseline prediction model is maximized and significantly less likely to be sparse because they need not match particular context factors. In another stage, presentation context factor models predict the performance of bid targets with respect to context factors. The historical observations applied to each presentation context factor model are those that match the particular context factors being predicted for by the model. The number of historical observations applied to each presentation context factor model is maximized and significantly less likely to be sparse because they can correspond to a plurality of bid targets, as opposed to a particular big target for conventional models.

In various embodiments, each presentation context factor model outputs an adjustment factor that quantifies the contribution of its corresponding presentation context factor(s) to the performance of bid targets. Predictions from baseline prediction models are adjusted by adjustment factors to incorporate context factors into the predictions. A single presentation context factor model can apply context to predictions from many baseline prediction models. Thus, a dedicated model is not needed to predict each combination of bid target and context factors.

BRIEF DESCRIPTION OF THE DRAWINGS

The present invention is described in detail below with reference to the attached drawing figures, wherein:

FIG. 2A is a diagram illustrating a user interface, in accordance with implementations of the present disclosure;

FIG. 2B is a diagram illustrating a user interface, in accordance with implementations of the present disclosure;

FIG. 3 is a flow diagram showing an exemplary method, in accordance with implementations of the present disclosure;

FIG. 4 is a flow diagram showing an exemplary method, in accordance with implementations of the present disclosure;

DETAILED DESCRIPTION

Figure 1:
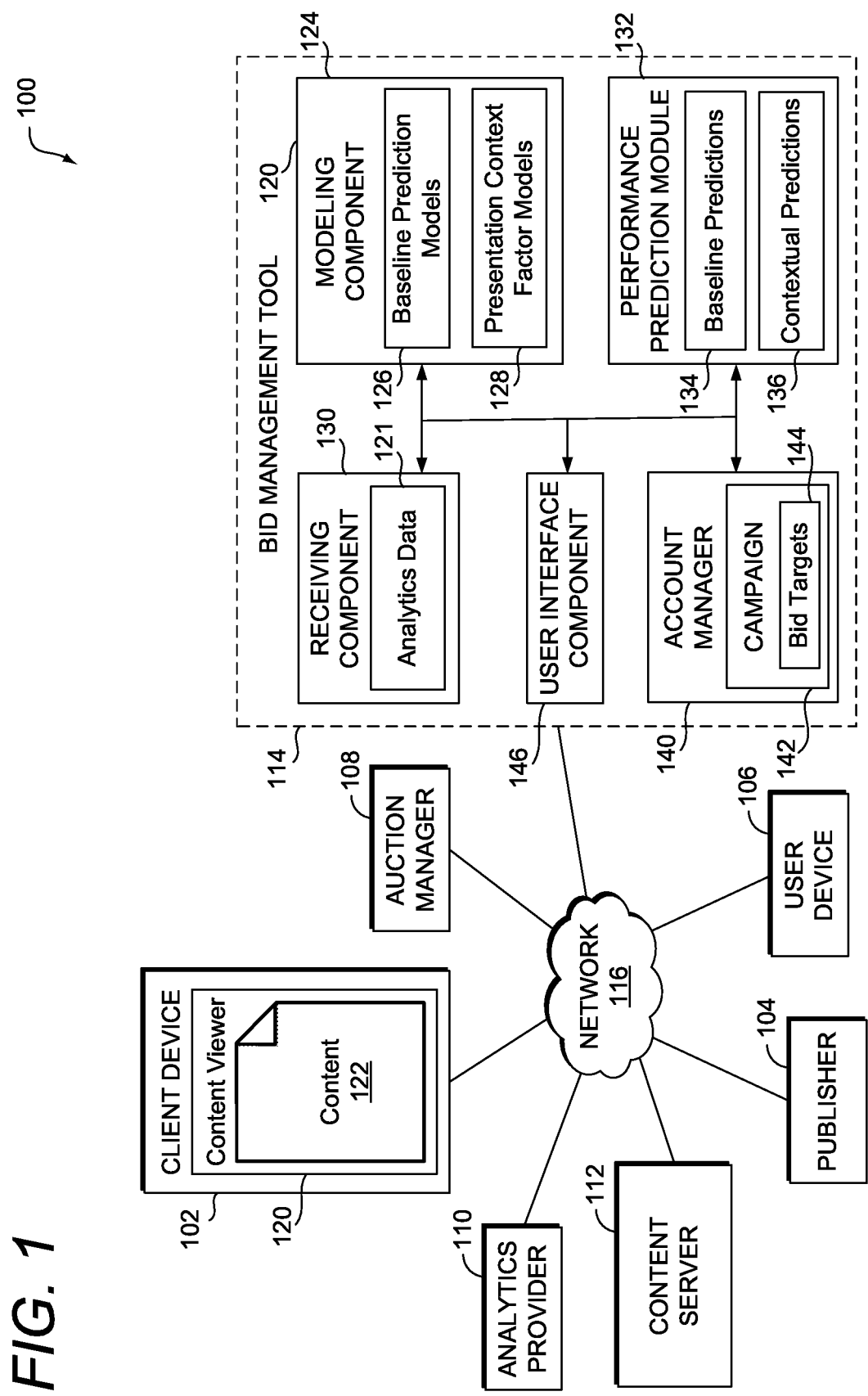
FIG. 1 is a diagram illustrating an exemplary system in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Bid management tools, such as Adobe® Media Optimizer, assist users in determining how much to bid on bid targets in content delivery auctions. These tools may assist users by predicting the performance of bid targets based on historical observations of their performance in a content delivery auction. Predictions for a bid target may be more accurate when they factor in the time of day or other context of presenting content in the content delivery auction. Typically, a dedicated model is used to predict performance of a bid target with respect to a particular set of context factors. Thus, an entirely new model with associated storage and processing is required to predict performance for the bid target with respect to at least one different context factor, or the same context factors for a different bid target. Additionally, this approach is prone to providing unreliable predictions because the number of historical observations that match both the bid target and each context factor being predicted by a model may be sparse, especially for a large set of context factors.

Embodiments of the present invention employ a multi-staged modeling approach for predicting the performance of bid targets in content delivery auctions from historical observations of their performance. In one stage, baseline prediction models predict the performance of bid targets without consideration to context factors. The number of historical observations applied to each baseline prediction model is maximized and significantly less likely to be sparse because they need not match particular context factors. In another stage, presentation context factor models predict the performance of bid targets with respect to context factors. The historical observations applied to each presentation context factor model are those that match the particular context factors being predicted for by the model. The number of historical observations applied to each presentation context factor model is maximized and significantly less likely to be sparse because they can correspond to a plurality of bid targets, as opposed to a particular big target for conventional models.

In various embodiments, each presentation context factor model outputs an adjustment factor that quantifies the contribution of its corresponding presentation context factor(s) to the performance of bid targets. Predictions from baseline prediction models are adjusted by adjustment factors to incorporate context factors into the predictions. A single presentation context factor model can apply context to predictions from many baseline prediction models. Thus, a dedicated model is not needed to predict each combination of bid target and context factors.

Modern auction-based content delivery systems often allow users to create various content delivery campaigns that are each defined by a set of bid targets. In various implementations, a group of baseline prediction models and presentation context factor models are maintained for each content delivery campaign of the user. It has been found that presentation context factors tend to have a similar impact on the performance of bid targets that are part of the same content delivery campaign. Thus, historical observations of each these bid targets can be applied to presentation context factor models to result in predictions that are highly accurate for the overall content delivery campaign.

Various terms are used throughout this description. Definitions of some terms are included below to provide a clearer understanding of the ideas disclosed herein:

As user herein "a content delivery auction" can refer to an electronic auction in which bidders submit bids electronically to an auction-based content delivery system over one or more network communications. An auction manager of the auction-based content delivery system can analyze the electronic bids to determine what digital content to present to a client on a client device and/or how to present the digital content to the client on the client device. The content that is presented to the client typically belongs to a winning bidder of the auction and is transmitted to the client device over one or more network communications.

As used herein, a "bid target" can refer to a predefined subject of bids made to a content delivery auction. Typically, a content delivery auction allows for bids to many different bid targets. Further, each bid target is typically used by the content delivery auction to link content to presentation opportunities on client devices. One example of a bid target is a keyword that clients can search on in a search engine using client devices. Detecting the keyword triggers one or more presentation opportunities in the content delivery auction.

As used herein, a "presentation context factor" can represent any characteristic of a presentation opportunity that is detectable by an auction manager of a content delivery auction. The auction manager can use detected presentation context factors to match bids to presentation opportunities in the content delivery auction. In some cases, bidders submit bids with a desired presentation context factor(s) or otherwise define a presentation context factor(s) for bids. The auction manager may select bids to consider and analyze for a presentation opportunity where the desired presentation context factor(s) of the bidder match the detected presentation context factors of the presentation opportunity. Examples of presentation context factors include the time of day or day of the week content is to be presented to a client. Other examples include the browser or geographic location of the device content is to be presented on for a client.

As used herein, a "content delivery campaign" can refer to a user-defined set of bid targets. A content delivery campaign may also include a set of digital content assigned to the campaign and/or bid targets of the campaign for presentation to clients when there are winning bids on the bid targets of the campaign. The campaign may further include a user-defined budget that specifies an amount, on average; the user would like to spend over a period of time. Campaigns are often used to organize categories of products or services of the user. A single user may set up multiple campaigns. Often, a user sets up campaigns with the auction-based content delivery system, which stores and manages the campaigns and applies the campaign settings to content delivery auctions on behalf of the user.

As used herein, a "prediction model" can refer to a computerized statistical model that leverages statistics to predict outcomes of unknown events. The prediction models may apply historical observations of one or more content delivery auctions using machine learning algorithms in order to predict performance and/or other aspects of bid targets in future instances of content delivery auctions. The prediction models may use regression analysis of the historical observations which is repeated and updated as new historical observations are created and received by the system.

As used herein, "analytics data" can refer to data that indicates performance of bid targets for historical bids made in one or more content delivery auctions. Analytics data may be analyzed to derive actual values of a performance metric that quantifies the performance of the bid targets for the historical bids. However, at least some of the actual values may be included in the analytics data. Actual values are used to generate and update the prediction models by providing the predictors of the models.

Turning now to FIG. 1, a diagram is provided illustrating an exemplary content delivery system 100 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes any number of client devices, such as client device 102, publishers, such as publisher 104, user devices, such as user device 106, auction managers, such as auction manager 108, analytics providers, such as analytics provider 110, content servers, such as content server 112, and bid management tools, such as bid management tool 114, all communicatively coupled via network 116.

System 100 shown in FIG. 1 is an example of a suitable architecture for implementing certain aspects of the present disclosure. Each the client devices, publishers, user devices, auction managers, analytics providers, content servers, and bid management tools of system 100 may be implemented as a single device or multiple devices cooperating in a distributed environment. Additionally, other components not shown may also be included within the distributed environment. Each device may correspond to computing device 600, later described with reference to FIG. 6, for example, and may communicate with each other via network 116.

Network 116 may be wired, wireless, or both. Network 116 may include multiple networks, or a network of networks, but is shown in simple form so as not to obscure aspects of the present disclosure. By way of example, network 116 can include one or more wide area networks (WANs), one or more local area networks (LANs), one or more public networks, such as the Internet, and/or one or more private networks. Where network 116 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 116 is not described in significant detail.

In various implementations, client device 102 and user device 106 are computing devices that are capable of accessing the Internet, such as the World Wide Web. The devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client device 102 and user device 106 can include one or more processors, and one or more computer-readable media. The computer-readable media may include computer-readable instructions executable by the one or more processors. The instructions may correspond to one or more applications, such as content viewer 120 shown on client device 102. Although not shown, user device 106 can also include a similar content viewer.

Content viewer 120 is an application that can be used to view published content, such as published content 122 on client device 102. In various implementations, the content viewer is a browser used to view published documents. In particular, content viewer 120 may be a web browser utilized to view published webpages. The content viewer can be an HTTP-compatible application (e.g. an Application that supports at least one HTTP protocol). Examples of content viewer 120 include Microsoft Internet Explorer, Google Chrome, Mozilla Firefox, and Apple Safari.

Exemplary content viewers for client device 102 and/or user device 106 include standalone applications that can be downloaded as a binary package and installed on a client device from an application store or marketplace, or other online repository. Other examples of content viewers include cloud applications that are hosted, at least partially, on cloud infrastructure, such as cloud infrastructure hosting bid management tool 114, and accessible via a client or user device, for example through a web browser or other cloud interface application. Further examples of content viewers include embedded applications, which are embedded into another application, such as a plug-in or extension to a web browser. As a further example, suitable content viewers may be integrated into an operating system of a client or user device.

As described above, one suitable example of content 122 is a web page. However, content 122 can generally be in any format suitable for presenting content on client device 102. In some implementations, a client interacts with client device 102 to execute content viewer 120, for accessing and displaying content 122. In response to user input, such as clicking on a link or typing in a uniform resource locator (URL), content viewer 120 may issue a webpage request to a web content server (e.g., content server 112) of publisher 104 via network 116 (e.g., via the Internet). In response to such a request, the content server may transmit the corresponding webpage code (e.g., HTML code corresponding to content 122) to content viewer 120. Optionally, one or more supplemental content items (or simply "content") selected by auction manager 108 may be included with content 122. In addition, or instead, content 122 may represent a content item selected by auction manager 108. Content viewer 120 may interpret the received webpage code and/or content items for display on client device 102. Content viewer 120 may generate additional requests for content from the content server, as needed.

Thus, as indicated above, in various implementations, auction manager 108 may determine content items for users on client devices, such as client device 102. One or more publishers, such as publisher 104 can provide content (e.g., content 122 and/or portions thereof) to client devices based on the determinations made by auction manager 108. Auction manager 108 can select what content items are provided to users and/or how content items are provided to users in connection with presentation opportunities. As used herein, a presentation opportunity can include a forecasted, future, or equivalent presentation opportunity. The determinations made by auction manager 108 are based, at least partially on a content delivery auction, where bidders provide bids on bid targets (e.g., designated bidding opportunities) in association with content items. Auction manager 108 can utilize the bids to rank content items and/or bidders for the presentation opportunities. For example, content may be displayed in a particular order or pattern in content viewer 120 or otherwise be selected for placement in a webpage or other serving medium in content viewer 120 based on the rankings. Higher content items associated with higher ranks are typically more prominently displayed to users in a serving medium, such as a webpage (e.g., content 122) relative to those associated with lower ranks.

Any suitable auction mechanism may be employed by auction manager 108. In some implementations, auction manager 108 utilizes a non-truthful auction, such as a generalized second-price auction (GSP) auction. The content delivery auction may be for various ranked slots (e.g., presentation opportunities for content items). The highest bidder may receive the first slot, the second-highest bidder the second slot, and so on.

As indicated above, bid targets represent designated bidding opportunities for content delivery auctions in auction-based content delivery systems. One suitable example of a content delivery auction is that employed by Google's AdWords or similar auction systems. In these examples, a bid target may correspond to a keyword, which can be predefined by a content provider or user and used to link a content item to a presentation opportunity. A further example of an auction type that may be utilized by auction manager 108 is a Vickrey-Clarke Groves (VCG) auction. Facebook uses a pacing algorithm for ad delivery, which is an example of a suitable auction system that employs a VCG auction.

Although the examples above are with respect to content items that are advertisements, it will be appreciated that the present disclosure is directed toward auction-based delivery of content to clients in a computer environment, which may or more not be advertisements. In such an environment, content providers typically have limited bidding currency (e.g., real or virtual) to allocate amongst bid targets.

Bid management tools, such as bid management tool 114, can be employed by bidders to predict performance of bid targets in content delivery auctions. Using this information, bidders can achieve more optimal bid management decisions for bids on bid targets in auction-based content delivery systems.

It may be desirable to incorporate presentation context of content as factors for these predictions. A presentation context factor generally represents any characteristic that describes a manner of presenting content in connection with a presentation opportunity associated with a bid target. Examples of presentation context factors include seasonality context factors (e.g., a time of day content is presented, a day of the week content is presented, a month of the year content is presented, etc.), device context factors (e.g., operating system (OS) of a device content is presented on, OS version of a device content is presented on, platform of a device content is presented on, browser of a device content is presented on, whether a device content is presented on is a mobile device or a desktop device, hardware vendor of a device content is presented on, etc.), geographic context factors (e.g., city of the client or the device, state of the client or the device, region of the client or the device, location of the client or the device, proximity of the client or the device to a location, etc.), and/or audience context factors (e.g., interests of clients, demographics of clients, characteristics of clients, predefined groupings of clients, etc.).

By incorporating presentation context factors into performance predictions of bid targets, the predictions can be more accurate and relevant to potential presentation opportunities that corresponds to the presentation context factors. For example, in some implementations, auction manager 108 allows bidders to specify one or more presentation context factors with their bids on bid targets. Auction manager 108 can match bids to presentation opportunities at least partially based on the specified presentation context factors. For example, a bid might only be applied to an instance of a content delivery auction where a presentation opportunity matches, at least partially, the specified presentation context factors. The presentation context factors may be part of a predefined taxonomy implemented by the auction manager, which may include one or more predefined potential categories and/or values that may be specified by bidders.

As an example of auction manager 108 matching bids to presentation opportunities, a client on client device 102 may perform a web search using content viewer 120 by providing a keyword to a search engine. Auction manager 108 can detect the keyword for a content delivery auction on presentation opportunities for content to include in search results of the search, as search results of the search, and/or on a search results page of the search. Auction manager 108 can further detect (e.g., based on the search) presentation context factors associated with the keyword for the presentation opportunities. As an example, presentation context factors can be sensed from client device 102 and/or content viewer 120. For example, client device 102 and/or content viewer 120 can provide (e.g., transmit information defining) one or more device context factors and/or geographic context factors to auction manager 108. Auction manager 108 can select bids on the keyword (i.e., bid target) to use in the content delivery action based on a comparison between the bidder specified presentation context factors and the sensed or identified presentation context factors of the presentation opportunities.

In conventional approaches, separate models are typically utilized for various combinations of bid targets and performance context factors. For example, a first model may be used to predict performance of the keyword "shoes" with the performance context factors of "on Monday, on a mobile device, and in San Francisco." A second model may be used to predict performance of the keyword "shoes" with the performance context factors of "on Monday, on a mobile device, and in San Jose." This results in excessive processing power and storage for making bid management decisions due to the number of models required. For example, each model must have separately maintained model data stored and processed to compute predictions.

Furthermore, these models and resultant predictions are unstable when the historical observations that match the models are sparse. For example, in the first model above, only historical observations for bids on shoes, on a Monday, on a mobile device, and in San Francisco may be used in the prediction model. The number of historical observations that meet at least these criteria may be sparse making the first model and resultant predictions unstable. Thus, bid management tools typically offer a limited number of bid target and performance context factor combinations for predictions or exclude performance context factors from their predictions altogether.

In accordance with implementations of the present disclosure, a bid management tool, such as bid management tool 114, can employ prediction models for any number of bid target and presentation context factor combinations while significantly reducing the instability and computational resources required in other approaches.

In various implementations, a multi-staged modeling approach is applied to predicting performance of content with respect to bid targets, such as keywords, of content delivery auctions. In one stage, baseline prediction models are employed for bid targets. Each baseline prediction model corresponds to at least one bid target. In some cases, each baseline prediction model corresponds to a single bid target. Thus, for example, one baseline prediction model can provide a baseline performance prediction for the keyword "shoes" and another can provide a baseline performance prediction for the keyword "clothes."

In another stage, predictions made by the baseline prediction models are used to generate presentation context factor models. Each presentation context factor model corresponds to at least one presentation context factor. In some cases, each presentation context factor model corresponds to a single presentation context factor. Each presentation context factor model provides an adjustment factor representing a contribution of a respective subset of presentation context factors to the performance of the bid targets. Thus, for example, one presentation context factor model can provide adjustment factors for both "on a Monday" and "on a Friday."

The adjustment factors are used to generate contextual predictions of performance for the bid targets that account for the corresponding presentation context factors. In some implementations, contributions of presentation context factors to the bid targets are captured by the presentation context factor models. Thus, the baseline prediction models need not factor in presentation context factors when applying analytics data to the models. For example, a baseline prediction model for the keyword "shoes" may use historical observations to make baseline predictions regardless of whether a historical observation is associated presentation of content "on a Monday," or "on a Tuesday," or any other specific combination of presentation context factors. As such, more historical observations of bid targets are available to build those models, thereby improving the stability of the models and resultant predictions compared to conventional approaches.

In further respects, adjustment factors from presentation context factor models can be applied to baseline predictions of bid targets (e.g., from baseline prediction models) to provide contextual predictions based on the corresponding presentation context factors. For example, to provide separate contextual predictions for the keywords "shoes," "clothes," "pants," and "hats" using on a Monday and separate contextual predictions for the keywords "shoes," "clothes," "pants," and "hats" using on a Tuesday, eight prediction models would be needed in conventional approaches (e.g., one for each keyword and presentation context factor combination). In contrast, only one baseline prediction model for the keywords and one presentation context factor model for the dimensions need be employed. This difference in the number of models quickly grows with the number of presentation context factors, bid targets, and combinations thereof employed for predictions. As such, the total number of models and corresponding processing and storage needed to provide predictions for various combinations of bid targets and presentation context factors are significantly reduced.

In the present implementation, bid management tool 114 employs modeling component 124 for constructing, storing, and maintaining prediction models, such as baseline prediction models 126 and presentation context factor models 128. The prediction models are constructed from analytics data, such as analytics data 121. The analytics data indicates performance of bid targets for historical bids made in one or more content delivery auctions. For example, the analytics data may provide actual values of a performance metric that quantifies performance of bid targets for historical bids made in one or more content delivery auctions. Each actual value may correspond to one or more bid targets. The actual values are applied by modeling component 124 to the prediction models. The actual values can be derived from the analytics data and/or included in the analytics data.

Examples of suitable performance metrics include one or more of conversion metrics, click through metrics, cost metrics, and revenue metrics. The performance metric employed may generally be any metric that quantifies performance of bid targets for corresponding historical bids made in one or more content delivery auctions. For example, the performance metric may quantify client interactions (e.g., clicks, selections, hovers, etc.) with content items (e.g., content 122 and/or portions thereof) presented on client devices (e.g., client device 102) in association with the corresponding bids.

In various implementations, the analytics data associates each actual value with one or more presentation context factors of a plurality of presentation context factors of presented content corresponding to the bid target. For example, each actual value may be assigned one or more presentation context factors using the analytics data. The assignment can indicate the presentation context factor(s) that are applicable to the presented content in a content delivery auction that corresponds to bid(s) of the actual value. Thus, for example, where the actual value quantifies performance of a bid made on "shoes," the analytics data may indicate that the actual value is further for a bid made on a Monday, in New York, and between at 2 PM and 3 PM EST.

Thus, the analytics data provides many actual values that are associated with many different combinations of bid targets and presentation context factors and that can be analyzed by modeling component 124 to build an update the prediction models. Bid management tool 114 uses receiving component 130 to receive the analytics data used by modeling component 124 to build and update the prediction models. In some implementations, bid management tool 114 receives the analytics data repeatedly over time, which may be accumulated in storage by bid management tool 114. The analytics data can be received by receiving component 130 from one or more analytics providers, such as analytics provider 110.

Analytics provider 110 may track bids (e.g., bid amounts) made on bid targets in one or more content delivery auctions. Analytics provider 110 may further track client performance context factor(s) associated with each bid in the one or more content delivery auctions. Additionally, analytics provider 110 may track client interactions associated with each bid in the one or more content delivery auctions. Analytics provider 110 may optionally utilize the tracked client interactions to determine actual values of performance metrics for the bid targets and/or bids. Any combination of this information may be transmitted to bid management tool 114 by analytics providers to provide the actual values used by modeling component 124. It will therefore be appreciate that the actual values themselves may be received by receiving component 130 and/or information used to determine one or more of the actual values.

In some cases, client device 102 transmits content item tracking information to analytics provider 110. For example, content 122 may include executable code to initiate a request for data from analytics provider 110 such that execution of the code causes content viewer 120 to generate a corresponding request for the data to analytics provider 110. In some implementations, the request itself may have analytics data contained therein or associated therewith, such that transmitting the request causes transmission of analytics data from client device 102 to analytics provider 110. Analytics provider 110 may process (e.g., parse) the request to extract data indicative of content interactions (e.g., analytics data) contained in or associated with the request. In some respects, analytics provider 110 may transmit data indicative of content interactions and/or a corresponding report to bid management tool 114, and/or other interested parties. The transmitted data may provide the actual values of content items to bid management tool 114 (e.g., include the values or information used to derive the values).

It is noted that analytics data 121 can comprise analytics data from one or more sources and/or providers. Furthermore, in some cases, one of those providers hosts auction manager 108 as well as the analytics provider. The provider may also optionally host one or more publishers, such as publisher 104 which provides content to client devices based on the results of content delivery auctions from auction manager 108. As a further option, the provider could also host a content server, such as content server 112, that provides content items to client devices based on results of the content delivery auctions. Thus, it should be appreciated that any combination of analytics provider 110, content server 112, auction manager 108, and publisher 104 can be provided by the same hosts and/or be a part of the same system or infrastructure.

Exemplary construction of baseline prediction models 126 and presentation context factor models 128 is described below. In the description below, performance prediction module 132 can be utilized to generate baseline predictions 134 (e.g., predicted values) from baseline prediction models 126, which are applied to presentation context factor models 128.

For each bid target i of bid targets n, let $f_i$ denote a baseline prediction model represented by a function that defines a bid-metric relationship. The function can provide as an output a predicted value $P_i$ of a performance metric for a given bid amount $b_i$. In various implementations, modeling component 124 can learn function $f_i$ from portions of analytics data, such as analytics data 121 that correspond to the bid target i. For example, the actual values that correspond to the bid target i can be applied to the baseline prediction model.

The actual values can be applied to a machine learning algorithm to generate function $f_i$. In some aspects of the present disclosure, each baseline prediction model excludes presentation context factors (e.g., those used in the presentation context factor models) from the predictors of the model (stale and/or unreliable data may be filtered from application to the models). For example, bid amount $b_i$ might be used as the only predictor for the baseline prediction models.

Let actual value $A_i$ denote an actual value of the performance metric for bid amount $b_i$ associated with one or more presentation context factors X by the analytics data. Further let G(X) denote a presentation context factor model represented by a function that defines a residual relationship between predicted values of the baseline prediction models and actual values associated with the one or more presentation context factors X provided by the analytics data.

G(X) provides an adjustment factor for one or more presentation context factors K. The adjustment factor quantifies a contribution of the one or more presentation context factors X to performance of the bid targets based on predicted values from the baseline prediction models. Modeling component 124 can learn function G(X) from a residual between $\Sigma_{i=1}^{n}A_i$ and $\Sigma_{i=1}^{n}P_i$. In some implementations, the residual is a multiplicative residual, such as $G(X)=\Sigma_{i=1}^{n}A_i/\Sigma_{i=1}^{n}P_i$. In other implementations, the residual is an additive residual, such as $G(X)=\Sigma_{i=1}^{n}A_i-\Sigma_{i=1}^{n}P_i$. Additive approaches to the models may employ additive linear regression.

As can be seen above, the adjustment factor utilizes one or more presentation context factors X as the predictors whereas these predictors are excluded from the baseline prediction models. Performance prediction module 132 can use the adjustment factor to compute contextual predicted values, such as contextual predictions 136, for bit targets. For example, performance prediction module can modify a predicted value (e.g., from a baseline prediction model) of one or more bid targets by the adjustment factor corresponding to the subset of the plurality of presentation context factors, such as by multiplying the predicted value by the adjustment factor.

In some implementations, where the adjustment factor is based on a multiplicative residual, the adjusted prediction for bid target i is given by $\tilde{P}=G(X)P_i$. In some cases, where the adjustment factor is based on an additive residual, the adjusted prediction for bid target i is given by $\tilde{P}=G_i(X)P_i$, where $\Sigma_i G_{i(X)}=G(X)$ and $G_i(X)/G_j(X)=P_i/P_j$, $\forall i,j$.

While the above examples describe a baseline prediction model with respect to a single bid target i, it will be appreciated that in some cases, one or more of the baseline prediction models may correspond to multiple bid targets. Furthermore each contextual predicted value from performance prediction module 132 can be for one or more bid targets regardless of whether the baseline prediction models correspond to one or multiple bid targets (e.g., by combing predicted values from multiple baseline prediction models). It is further noted that the adjustment factor employed in modifying a predicated value could be a composite of multiple adjustment factors from different presentation context factor models. A composite adjustment factor may be employed to predict bid targets based on presentation factors from multiple presentation factor models.

Generally, the presentation context factor models are constructed utilizing actual values associated with many different bid targets (e.g., bid targets n, above), whereas the baseline prediction models are generally constructed utilizing actual values associated with fewer bid targets (e.g., a single, bid target i, above). By utilizing many different bid targets for the presentation context factor models, sufficient actual values are available for the models, even in cases where the actual values are required to be associated with the one or more presentation context factors of the model. Thus, the risk of unstable models and resultant predictions due to sparse data is significantly reduced.

In various implementations, one or more selection criteria are utilized to determine which bid targets (e.g., bid targets n) should have their historical observations used to construct the presentation context factor models. By using appropriate selection criteria for the bid targets of a presentation context factor model, the historical observations that are applied to the presentation context factor model are more likely to be statistically correlated so that the adjustment factor sufficiently quantifies the contribution of the one or more presentation context factors of the model to performance of the bid targets.

In some cases, the one or more selection criteria comprise the bid targets being in a common content delivery campaign of a user. In particular, it has been found that performance context factors tend to have similar impacts on performance in content delivery auctions for bid targets that are part of the same content delivery campaign. As an example, assume that a content delivery campaign includes the bid targets "shoes," "socks," "pants," "hats," and "clothes" as keywords. The performance of bids on those keywords tends to be similarly impacted by, for example, specifying that the bids are for presentation opportunities that occur on Mondays (or other presentation context factors or combinations thereof). While being in the same content delivery campaign is one factor that may be utilized to select the bid targets, other or additional criteria (e.g., to further refine the selection) can be employed. In some cases, the selection criteria used could optionally vary depending on the presentation context factor model or amongst all of the presentation context factor models. For example, the selection criteria may vary based on the quantity of available historical observations that satisfy the criteria. The criteria may be narrowed when more historical observations are available and broadened when fewer historical observations are available.

As shown in FIG. 1, bid management tool 114 includes account manager 140 for managing campaigns of users. The users may be those associated with user devices, such as user device 106. Account manager 140 is configured to track a content delivery campaign of a user, such as campaign 142. The content delivery campaigns each comprise bid targets, such as bid targets 144, which may be defined by a user associated with the content delivery campaign.

In some cases, the campaign was defined by the user external to bid management tool 114, such as through auction manager 108. In other cases, one or more features of the campaign may be defined using bid management tool 114. For example, bid management tool 114 includes user interface component 146 for receiving and transmitting communications with the user. User interface component 146 may communicate with the user over one or more network communications, such as where bid management tool 114 is at least partially cloud-based. Communications may be via a context viewer on user device 106, which may be an application, such as a web browser. The user can provide input to the application to communicate with bid management tool 114, and may receive communications therefrom via the application. It is noted that in some cases, one to all components of bid management tool 114 can be included on user device 106. In some implementations, campaign 142 is copied from auction manager 108, which maintains the campaign. For example, a user may provide credentials to bid management tool 114 for accessing the campaign via auction manager 108 via user interface component 146.

In some cases, the content delivery campaign is optionally associated with a single content delivery auction, but it may instead be associated with multiple auctions. Furthermore, a user may have multiple content delivery auctions and/or campaigns tracked by bid management tool 114 (e.g., associated with different auction managers, analytics providers, publishers, etc.). As an example, the same user could have a Bing Ads campaign and a Google AdWords campaign, each with associated bid targets.

In some cases, account manager 140 maintains a separate set of baseline prediction models and presentation context factor models for each campaign. However, one or more campaigns may share one or more models. Typically, analytics data 121 is received by receiving component 130 in association with a user. The analytics data is applied to the models associated with the user based on the association indicated by the analytics data (e.g., a user ID in the analytics data). However, it is noted that in some cases, some analytics data could be applied to models cross-user, such as for models that lack sufficient actual values.

Similarly, analytics data 121 may be received by receiving component 130 in association with a campaign, auction manager, and/or content delivery auction. The analytics data can be applied to the models based on the association(s) indicated by the analytics data (e.g., a campaign ID, auction manager, and/or content delivery auction ID provided by analytics provider 110, or based on the source of the data). For example, the analytics data could be applied to a set of models associated with a campaign indicated by the analytics data. However, it is noted that in some cases, some analytics data could be applied to models cross-campaign, and/or cross-content delivery auction, such as for models that lack sufficient actual values.

Performance prediction module 132 can apply contextual predicted values of bid targets to one or more bid optimization algorithms to compute an optimal bid about for one or more keywords. As an example, in some cases, the campaigns are associated with budgets and performance prediction module 132 optimizes bid amounts for each bid target based on the budget. For campaign 142, the user may have defined the budget for a specific campaign using user interface component 146. As another example, the budget could be at least partially cross-campaign.

Referring now to FIGS. 2A and 2B, an exemplary user interface 200 that can be employed to communicate with bid management tool 114 is shown. User interface 200 may be presented to a user on user device 106. As shown user interface 200 includes campaigns tab 252, which the user can select to configure one or more campaigns and/or features or options thereof. Campaign 254 is one example of a campaign that has been configured by a user, which includes a plurality of sub-campaigns. A campaign that includes sub-campaigns may be referred to as a portfolio.

As indicated by budget 256, users can set budgets for campaigns and/or sub-portions thereof that performance prediction module 132 can employ in optimizing bid amounts. In optimizing based on a budget(s), performance prediction module 132 may typically compute the optimal bid amount for each bid target being considered, such that that total bid amounts remain within the budget(s).

It is further noted that performance prediction module 132 can optimize bids based on one or more designated performance context factors and use contextual predictions that are associated with those factors for the optimization (e.g., use only contextual values that are based on a presentation context factor model representing users in San Diego). The user may specify or otherwise indicate or select the one or more designated performance context factors in bid management tool 114.

For example, in screenshot 250 of FIG. 2, the user has selected category 258 of presentation context factors, which includes each day of the week as a presentation context factor. As shown, user interface 200 displays predicted values 258A, adjustment factors 258B, and performance predictions 258C (e.g., contextual predicted values). Predicted values 258A are each composite predicted values combined from the bid targets of the campaign. Adjustment factors 258B are from presentation context factor models specific to the presentation context factor listed in the row (i.e., the day of the week). Performance predictions 258C are composite contextual predicted values computed by multiplying the predicted values 258A by corresponding adjustment factors 258B.

As another example, in screenshot 266, the user has selected category 260 of presentation context factors, which includes various geographic locations as presentation context factors. Similar category specific displays of predictions are provided for category 260 as category 258, and therefore they are not described in additional detail.

The optimized bids on the bid targets may be displayed to the user in user interface 200. In addition, or instead, the optimized plurality of bids on the bid targets can be submitted to a content delivery auction (e.g., the auction associated with the campaign being optimized) over one or more network communications with an auction manager. For example, the optimized bids could be automatically submitted to auction manager 108 or could be submitted in response to a selection by the user. Submitting the bids causes the bids to be applied to the content delivery auction. Thus, at least one content item can be caused to be presented on a client device (e.g., client device 102) in the content delivery auction based on one or more of the optimized plurality of bids (e.g., a content idem associated with the user). Therefore, the optimized bids impact the display, memory, and processing on client device 102 (e.g., cause sounds, images, video, and or text to be presented thereon).

Referring to FIG. 3, a flow diagram showing method 300 is shown. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 310, method 300 includes receiving analytics data corresponding to bid targets. For example, receiving component 130 can receive analytics data 121 that indicates performance of bid targets 144 for historical bids made in one or more content delivery auctions hosted by auction manager 108.

At block 320, method 300 includes maintaining baseline prediction models for the bid targets. For example, modeling component 124 can maintain baseline prediction models 126 for bid targets 144. Baseline prediction models 126 can use analytics data 121 to predict performance of bid targets 144 in one or more future instances of at least one content delivery auction.

At block 330, method 300 includes maintaining a context factor model. For example, modeling component 124 can maintain presentation context factor models 128 that each provide an adjustment factor that quantifies a contribution of a subset of a plurality of presentation context factors associated with bid targets 144 by analytics data 121 to performance of bid targets 144 based on baseline predictions 134 from baseline prediction models 126.

At block 340, method 300 includes computing a contextual predicted value using an adjustment factor from the presentation context factor model. For example, performance prediction module 132 can compute contextual predictions 136 using the adjustment factor for the subset of the plurality of presentation context factors.

At block 350, method 300 includes transmitting a performance prediction to a user device of a user. For example, user interface component 146 can transmit performance predictions 258C to user device 106, where performance predictions 258C are based on at least contextual predictions 136.

Referring to FIG. 4, a flow diagram showing method 400 is shown. At block 410, method 400 includes receiving analytics data corresponding to bid targets. For example, receiving component 130 can receive analytics data 121 that provides actual values of a performance metric that quantifies performance of bid targets 144 for historical bids made in one or more content delivery auctions.

At block 420, method 400 includes storing baseline model data of baseline prediction models for the bid targets. For example, modeling component 124 can store baseline model data of baseline prediction models 126 for bid targets 144. Baseline prediction models 126 can use the actual values to predict performance of bid targets 144.

At block 430, method 400 includes identifying a group of actual values based on a presentation context factor. For example, modeling component 124 can identify a group of the actual values of a plurality of bid targets 144 based on the actual value being associated with a subset of a plurality of presentation context factors associated with bid targets 144 in analytics data 121.

At block 440, method 400 includes storing context model data of the presentation context factor based on the group of actual values. For example, modeling component 124 can store context model data of one of presentation context factor models 128 that provides an adjustment factor that quantifies a contribution of the subset of the plurality of presentation context factors to performance of bid targets 144 based on the group of the actual values and baseline predictions 134 from baseline prediction models 126.

At block 450, method 400 includes computing a contextual predicted value using an adjustment factor from the presentation context factor model. For example, performance prediction module 132 can compute contextual predictions 136 using the adjustment factor corresponding to the subset of the plurality of presentation context factors.

At block 460, method 400 includes transmitting a performance prediction to a user device of a user. For example, user interface component 146 can transmit performance predictions 258C to user device 106, where performance predictions 258C are based on at least contextual predictions 136.

Figure 5:
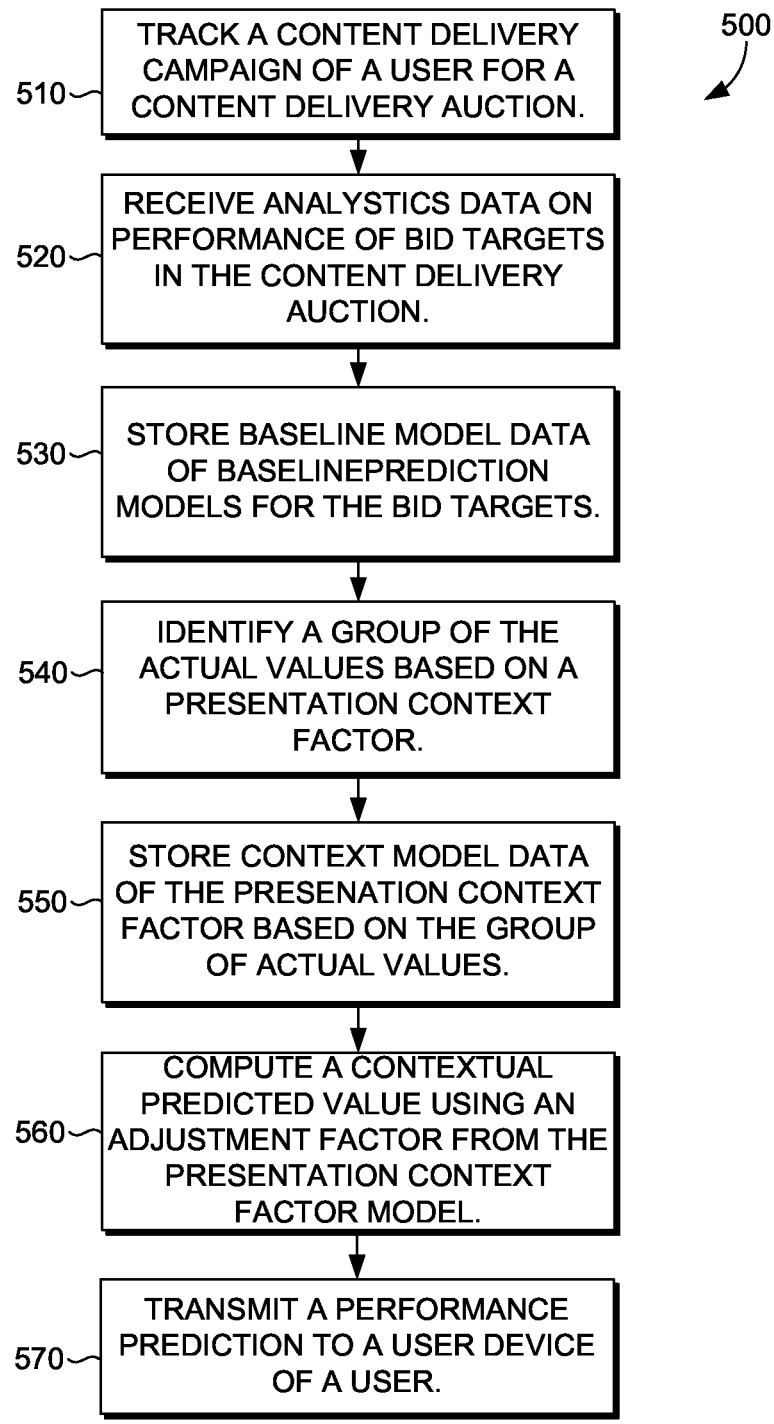
FIG. 5 is a flow diagram showing an exemplary method, in accordance with implementations of the present disclosure.

Referring to FIG. 5, a flow diagram showing method 500 is shown. At block 510, method 500 includes tracking a content delivery campaign of a user for a content delivery auction. For example, account manager 140 can track content delivery campaign 142 of a user associated with user device 106. Content delivery campaign 142 comprises bid targets 144 defined by the user for a content delivery auction. Each of bid targets 144 can represent a keyword that the content delivery auction accepts bids on to match content, such as content 122, with presentation opportunities that correspond to the keyword.

At block 520, method 500 includes receiving analytics data on performance of bid targets in the content delivery auction. For example, receiving component 130 can receive analytics data 121 from analytics provider 110. Analytics data 121 provides, for each bid target of bid targets 144, actual values of a performance metric that quantifies performance of the keyword of the bid target for historical bids made by the user in the content delivery auction. Analytics data 121 associates each actual value with one or more presentation context factors of a plurality of presentation context factors of presented content (e.g., on client device 102) corresponding to bid targets 144.

At block 530, method 500 includes storing baseline model data of baseline prediction models for the bid targets. For example, modeling component 124 can store baseline model data of one of baseline prediction models 126 for each bid target of bid targets 144 of content delivery campaign 142. The baseline prediction model can use the actual values corresponding to the bid target to predict performance of the bid target.

At block 540, method 500 includes identifying a group of actual values based on a presentation context factor. For example, modeling component 124 can identify a group of the actual values of a plurality of bid targets 144 of content delivery campaign 142 based on the actual values being associated with a subset of the plurality of presentation context factors by analytics data 121.

At block 550, method 500 includes storing context model data of the presentation context factor based on the group of actual values. For example, modeling component 124 can store context model data of one of presentation context factor models 128 of the subset of the plurality of presentation context factors. The presentation context factor model provides an adjustment factor that quantifies a contribution of the subset of the plurality of presentation context factors to the performance metric based on the group of the actual values and corresponding predicted values of baseline predictions 134 from baseline prediction models 126.

At block 560, method 500 includes computing a contextual predicted value using an adjustment factor from the presentation context factor model. For example, performance prediction module 132 can compute a contextual predicted value of contextual predictions 136 for a designated keyword of the keywords using a predicted value of baseline predictions 134 from one of baseline prediction models 126 that corresponds to the keyword modified by the adjustment factor corresponding to the subset of the plurality of presentation context factors.

At block 570, method 500 includes transmitting a performance prediction to a user device of a user. For example, user interface component 146 can transmit performance predictions 258C to user device 106, where performance predictions 258C are based on at least contextual predictions 136.

Figure 6:
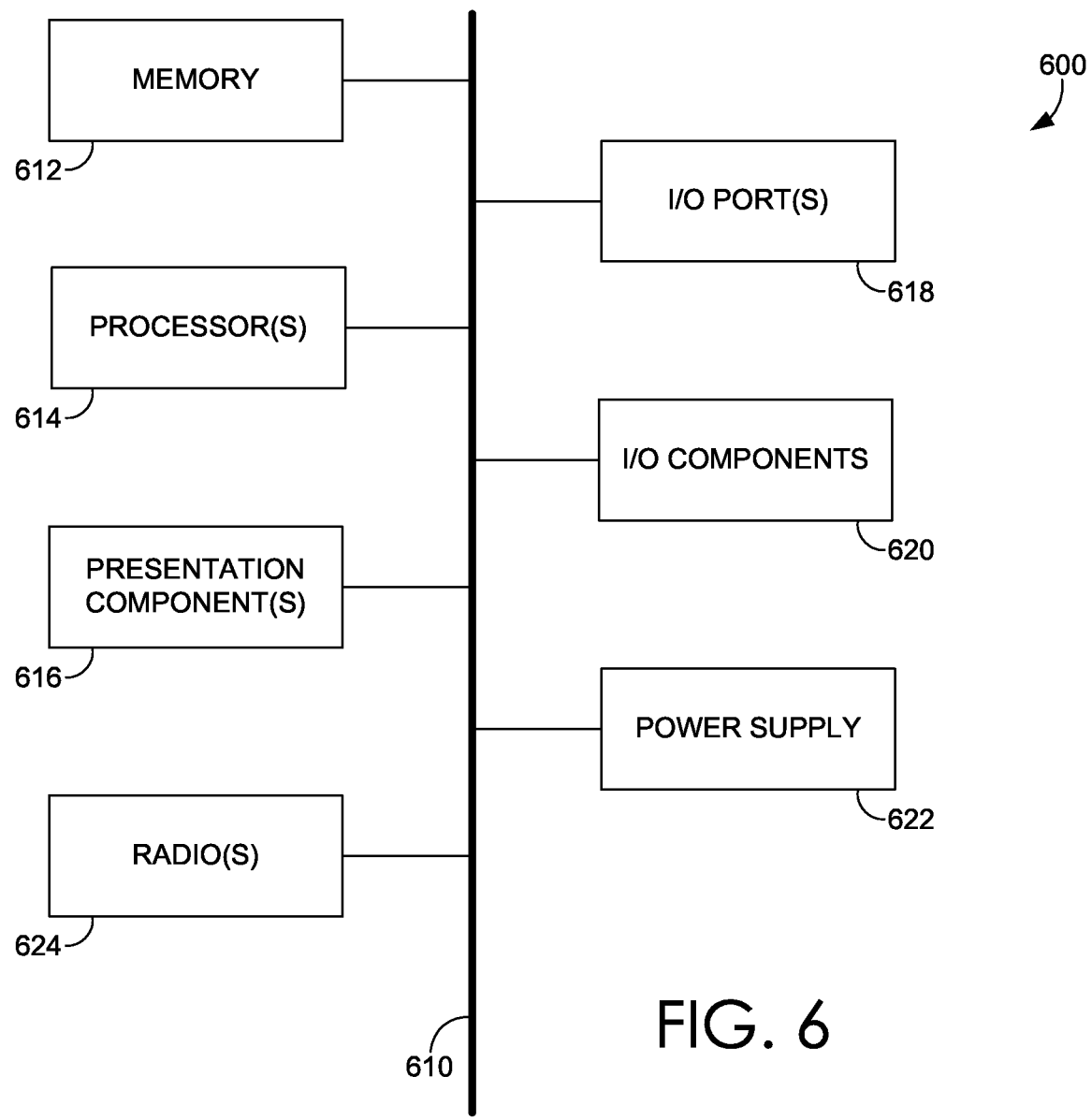
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

As described above, implementations of the present disclosure relate to providing readership information of published documents to publishers based on eye-tracking. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   accessing baseline prediction models configured to predict future performance of detectible triggers of presentation opportunities in a first stage in one or more content delivery auctions, without considering presentation opportunity characteristics, using analytics data indicating historical performance of the detectible triggers;
   learning an adjustment factor of a presentation context factor model based on a residual between predicted values of the baseline prediction models and actual values associated with a subset of the presentation opportunity characteristics associated with the detectible triggers of presentation opportunities, wherein the presentation context factor model is configured to learn the adjustment factor in a second stage that quantifies a contribution of the subset of the presentation opportunity characteristics to the future performance;
   computing a contextual predicted value using the adjustment factor for the subset of the presentation opportunity characteristics; and
   transmitting a performance prediction that is based on at least the contextual predicted value to a user device.

2. The method of claim 1, wherein the detectible triggers of presentation opportunities are selected from a content delivery campaign of a user associated with the user device.

3. The method of claim 1, further comprising generating context model data of the presentation context factor model from predicted values of a plurality of the baseline prediction models.

4. The method of claim 1, wherein the subset of the presentation opportunity characteristics comprise one or more of a seasonality content factor, a device context factor, a geographic context factor, and an audience context factor of presenting content.

5. The method of claim 1, wherein the baseline prediction model predicts the performance metric for the detectible trigger as a function of bid amount.

6. The method of claim 1, further comprising:
   optimizing a plurality of bids on the detectible triggers within a budget defined by a user; and
   submitting the optimized plurality of bids to a content delivery auction over one or more network communications, the submitting causing at least one content item to be presented on a client device in the content delivery auction based on one or more of the optimized plurality of bids.

7. The method of claim 1, wherein the baseline prediction models predict the future performance of the detectible triggers for a user and the analytics data is used in the baseline prediction models based on indicating the historical performance of the user in the one or more content delivery auctions.

8. The method of claim 1, further comprising constructing the baseline prediction models for the detectible triggers based on identifying the detectible triggers as being part of a content delivery campaign of a user, wherein the historical performance is of the user in the content delivery campaign.

9. The method of claim 1, further comprising receiving the analytics data from an analytics provider over one or more network communications, wherein the analytics data comprises actual values of a performance metric of the detectible triggers based on historical bids made in the one or more content delivery auctions.

10. The method of claim 1, further comprising:
    tracking performance of keywords of a content delivery campaign of a user in a content delivery auction of the one or more content delivery auctions; and
    receiving the analytics data that provides actual values of a performance metric of the keywords based on historical bids made in the content delivery auction, wherein the detectible triggers comprise the keywords.

11. A computer-implemented system for predicting content performance in content delivery auctions, the system comprising:
    one or more processors; and
    one or more memories comprising program instructions stored thereon that are executable by the one or more processors to cause the one or more processors to perform operations comprising:
    accessing baseline prediction models configured to predict future performance of detectible triggers of presentation opportunities in a first stage in one or more content delivery auctions, without considering presentation opportunity characteristics, using analytics data indicating historical performance of the detectible triggers;
    learning an adjustment factor of a presentation context factor model based on a residual between predicted values of the baseline prediction models and actual values associated with a subset of the opportunity characteristics associated with the detectible triggers of presentation opportunities, wherein the presentation context factor model is configured to learn the adjustment factor in a second stage that quantifies a contribution of the subset of the presentation opportunity characteristics to the future performance;
    computing a contextual predicted value using the adjustment factor for the subset of the presentation opportunity characteristics; and
    transmitting a performance prediction that is based on at least the contextual predicted value to a user device.

12. The system of claim 11, wherein the detectible triggers are from a content delivery campaign of a user associated with the user device.

13. The system of claim 11, wherein the operations further comprise generating context model data of the presentation context factor model from predicted values of a plurality of the baseline prediction models.

14. The system of claim 11, wherein the subset of the presentation opportunity characteristics comprise one or more of a seasonality content factor, a device context factor, a geographic context factor, and an audience context factor of presenting content.

15. The system of claim 11, wherein the baseline prediction model is configured to predict the performance metric for the detectible trigger as a function of bid amount.

16. One or more non-transitory computer-storage media storing computer-useable instructions that, when executed by one or more computing devices, cause the one or more computing devices to perform a method comprising:
 accessing baseline prediction models configured to predict future performance of detectible triggers of presentation opportunities in a first stage in one or more content delivery auctions, without considering presentation opportunity characteristics, using analytics data indicating historical performance of the detectible triggers;
 learning an adjustment factor of a presentation context factor model based on a residual between predicted values of the baseline prediction models and actual values associated with a subset of the presentation opportunity characteristics associated with the detectible triggers of presentation opportunities, wherein the presentation context factor model is configured to learn the adjustment factor in a second stage that quantifies a contribution of the subset of the presentation opportunity characteristics to the future performance;
 computing a contextual predicted value using the adjustment factor for the subset of the presentation opportunity characteristics; and
 transmitting a performance prediction that is based on at least the contextual predicted value to a user device.

17. The one or more computer-storage media of claim 16, wherein the detectible triggers are from a content delivery campaign of a user associated with the user device.

18. The one or more computer-storage media of claim 16, wherein the method further comprises generating context model data of the presentation context factor model from predicted values of a plurality of the baseline prediction models.

19. The one or more computer-storage media of claim 16, wherein the subset of the presentation opportunity characteristics comprise one or more of a seasonality content factor, a device context factor, a geographic context factor, and an audience context factor of presenting content.

* * * * *